US008036202B2

(12) United States Patent
Biederman et al.

(10) Patent No.: US 8,036,202 B2
(45) Date of Patent: *Oct. 11, 2011

(54) PHYSICAL LAYER TRANSCEIVER WITH INTEGRATED TIME SYNCHRONIZATION

(75) Inventors: Daniel Christian Biederman, San Jose, CA (US); Haichuan Tan, Santa Clara, CA (US); Howard Borchew, Saratoga, CA (US); Senthil Arumugam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/493,981

(22) Filed: Jul. 27, 2006

(65) Prior Publication Data
US 2011/0222560 A1   Sep. 15, 2011

(51) Int. Cl.
  H04B 7/12   (2006.01)
  H04L 12/28  (2006.01)
  H04L 7/00   (2006.01)
  H04L 29/06  (2006.01)
  H04K 1/00   (2006.01)
  G06F 15/16  (2006.01)

(52) U.S. Cl. ........ 370/347; 370/392; 375/354; 713/151; 380/255; 709/250

(58) Field of Classification Search ................... 370/347, 370/392
See application file for complete search history.

(56) References Cited

U.S. PATENT DOCUMENTS

| 6,347,084 | B1 | 2/2002 | Hulyalkar et al. | |
|---|---|---|---|---|
| 6,492,944 | B1 | 12/2002 | Stilp | |
| 7,313,686 | B2 | 12/2007 | Biederman et al. | |
| 7,327,693 | B1 | 2/2008 | Rivers et al. | |
| 2004/0090980 | A1* | 5/2004 | Song et al. | 370/445 |
| 2004/0141526 | A1 | 7/2004 | Balasubramanian et al. | |
| 2005/0058159 | A1 | 3/2005 | Chapman | |
| 2005/0071628 | A1 | 3/2005 | Yang et al. | |
| 2005/0207387 | A1 | 9/2005 | Middleton et al. | |
| 2006/0245454 | A1 | 11/2006 | Balasubramanian et al. | |
| 2007/0147562 | A1* | 6/2007 | Eidson | 375/354 |
| 2007/0223477 | A1* | 9/2007 | Eidson | 370/392 |
| 2008/0025344 | A1 | 1/2008 | Biederman et al. | |
| 2008/0080562 | A1* | 4/2008 | Burch et al. | 370/503 |

OTHER PUBLICATIONS

U.S. Appl. No. 11/494,104, filed Jul. 27, 2006, Biederman et al.
"IEEE Standard for a Precision Clock Synchronization Protocol for Networked Measurement and Control Systems," IEEE Std 1588-2002, IEEE Instrumentation and Measurement Society, New York, NY, USA, Nov. 8, 2002, 154 pages.

(Continued)

Primary Examiner — Pierre-Louis Desir
Assistant Examiner — Timothy Pham
(74) Attorney, Agent, or Firm — The Law Office of Kirk D. Williams (57) ABSTRACT

Disclosed, inter alia, is a Physical Layer Transceiver (PHY) with integrated time synchronization, such as, but not limited to, IEEE 1588 Standard for a Precision Clock Synchronization Protocol for Networked Measurement and Control Systems. The PHY includes circuitry to maintain a current time, and to trigger the storage of timestamps corresponding to received frames. Typically, in response to a request from an external device, the timestamps are retrieved from storage and are communicated to the external device. By moving the triggering of the storage of the timestamps by the PHY itself, rather than by a monitoring of the traffic between the PHY and the Media Access Controller (MAC), higher accuracy can typically be achieved.

20 Claims, 7 Drawing Sheets

OTHER PUBLICATIONS

John Eidson, "IEEE-1588 Standard for a Precision Clock Synchronization Protocol for Networked Measurement and Control Systems—A Tutorial," Agilent Technologies, Inc., Oct. 10, 2005, 106 pages.

Hans Weibel, "High Precision Clock Synchronization according to IEEE 1588 Implementation and Performance Issues," Proc. Embedded World 2005, Nurenberg, Germany, Feb. 2005, 9 pages.

John Guilford, "Design of an FPGA-Based Hardware IEEE-1588 Implementation," IEEE-1588 Conference, Oct. 2005, Agilent Technologies, 10 pages.

John Guilford, "Design of an FGPA-Based Hardware IEEE-1588 Implementation," IEEE-1588 Conference and Plug-Fest, Winterthur, Switzerland, Agilent Technologies, Oct. 10-12, 2005, 24 pages.

Holler et al., "Chip-Design Building Blocks for Precision Clock Synchronization in Ethernet Networks," Institute of Computer Technology, Oregano Systems, 23 pages.

"ERTEC 200 Enhanced Real-Time Ethernet Controller with 32-bit RISC CPU Core," Preliminary Data Sheet, NEC Electronics Corporation, May 2006, 45 pages.

"ERTEC 400 Enhanced Real-Time Ethernet Controller with 32-bit RISC CPU Core," Preliminary Data Sheet, NEC Electronics Corporation, Dec. 2005, 41 pages.

* cited by examiner

PHYSICAL LAYER TRANSCEIVER WITH INTEGRATED TIME SYNCHRONIZATION

TECHNICAL FIELD

One embodiment of the invention relates to communications and computer systems, especially routers, packet switching systems, and other devices; and more particularly, one embodiment relates to a Physical Layer Transceiver (PHY) with integrated time synchronization, such as, but not limited to, IEEE 1588 Precision Time Protocol.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Measurement and control systems are widely used in traditional test and measurement, industrial automation, communication systems, electrical power systems and many other areas of modern technology. The timing requirements placed on these measurement and control systems are becoming increasingly stringent. Traditionally these measurement and control systems have been implemented in a centralized architecture in which the timing constraints are met by careful attention to programming combined with communication technologies with deterministic latency. In recent years an increasing number of such systems utilize a more distributed architecture and increasingly networking technologies having less stringent timing specifications than the older more specialized technologies. In particular, Ethernet communications are becoming more common in measurement and control applications. This has led to alternate means for enforcing the timing requirements in such systems. One such technique is the use of system components that contain real-time clocks, all of which are synchronized to each other within the system. This is very common in the general computing industry. For example, essentially all general purpose computers contain a clock. These clocks are used to manage distributed file systems, backup and recovery systems and many other similar activities. These computers typically interact via LANs and the Internet. In this environment the most widely used technique for synchronizing the clocks is the Network Time Protocol, NTP, or the related SNTP.

It is not uncommon for the timing accuracies to be required to be in the sub-microsecond range, with the requirement that this synchronization must be available on a range of networking technologies including Ethernet as well as other technologies found in industrial automation and similar industries. IEEE 1588 addresses the clock synchronization requirements of measurement and control systems. However, especially when used in conjunction with Ethernet and other local area network technologies, there can be jitter in the synchronization, which leads to a larger inaccuracies among clocks.

Figure 1:
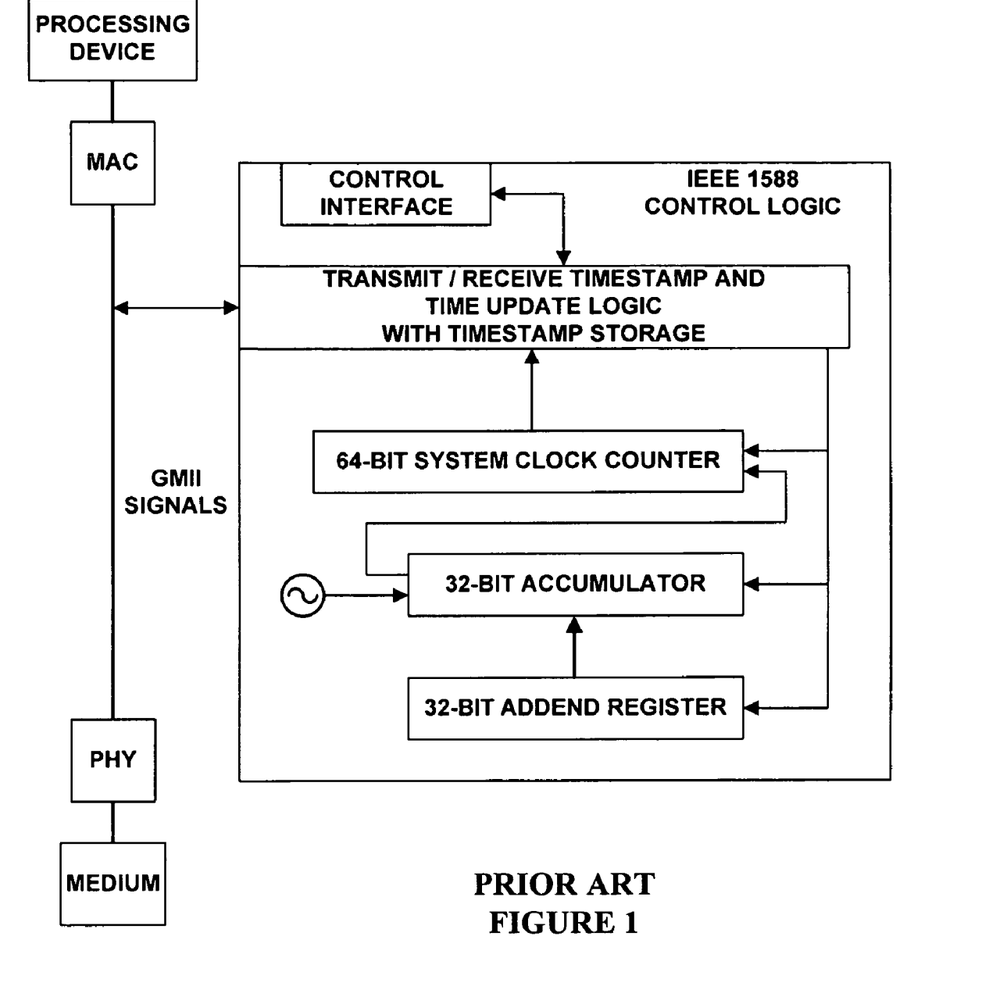
- FIG. 1 illustrates a prior art configuration for associating timestamps with frames.

FIG. 1 illustrates a prior art configuration for associating timestamps with frames. Shown is a hardware-assist circuit which monitors the 125 MHZ GMII transmit and receive signals between the MAC and PHY. Two independent PTP message detection logic blocks facilitate time stamping of transmit and receive paths. The hardware assist uses a frequency compensated clock to keep system time. In this circuit a 32-bit accumulator adds the contents of addend register to itself at the frequency of 100 MHz. The 64-bit system clock counter is incremented whenever the accumulator overflows. This provides a high precision frequency compensated clock that can be tuned to one part per billion compensation accuracy.

SUMMARY

Disclosed, inter alia, is a Physical Layer Transceiver (PHY) with integrated time synchronization, such as, but not limited to, IEEE 1588 Standard for a Precision Clock Synchronization Protocol for Networked Measurement and Control Systems. In one embodiment, the PHY includes: analog circuitry configured to transmit to, and receive data from, a data transmission medium; storage; digital circuitry, coupled to the analog circuitry, and configured to transmit to, and receive from, a Media Access Controller (MAC), and to communicate timestamps stored in the storage to an external device; and timing circuitry, coupled to the digital circuitry, configured to generate timestamps. The PHY is configured to cause a timestamp to be stored in said storage for each of a plurality of received and/or sent frames.

In one embodiment, the PHY is disposed on a single physical chip. In one embodiment, the PHY includes multiple MAC to media interfaces, which are each configured to use the timestamps generated by the timing circuitry. In one embodiment, the analog circuitry and/or the digital circuitry is configured to cause the storage of the timestamps. In one embodiment, the digital circuitry implements a state machine for identifying whether or not to cause a timestamp to be stored for a particular frame. In one embodiment, the interface circuitry is configured to communicate the timestamps stored in the storage to the external device.

In one embodiment, the timestamps are generated based on an IEEE 1588 Standard for a Precision Clock Synchronization Protocol for Networked Measurement and Control Systems (1588) clock. In one embodiment, the 1588 clock is a slave clock, and said timing circuitry is configured to receive timing messages from, and send timing messages to, a 1588 master clock. In one embodiment, the 1588 clock is a master clock, and said timing circuitry is configured to receive timing messages from, and send timing messages to, a 1588 slave clock.

In one embodiment, the MAC corresponds to IEEE 802.3, and said digital circuitry is configured to use said storage for storing an IEEE 802.3 memory map. In one embodiment, the timestamps are stored in or access via a vendor specific portion of the IEEE 802.3 memory map. In one embodiment, the predetermined configuration parameters for controlling said generation of timestamps are stored in said memory map.

In one embodiment, which frames comprise the plurality of frames are determined based on a parsing of frames to identify whether or not a timestamp should be stored for a parsed frame. In one embodiment, the PHY is configured to adjust a current timestamp from said timing circuitry by a parsing delay to represent the time that the start of the frame was sent or received in response to said identification to store a particular parsed frame.

BRIEF DESCRIPTION OF THE DRAWINGS

The appended claims set forth the features of the invention with particularity. The invention, together with its advan

DETAILED DESCRIPTION

Disclosed, inter alia, is a Physical Layer Transceiver (PHY) with integrated time synchronization, such as, but not limited to, IEEE 1588 Standard for a Precision Clock Synchronization Protocol for Networked Measurement and Control Systems. This synchronization includes all forms of synchronization/manipulation, such as, but not limited to, time (e.g., time of day), phase synchronization, and frequency synchronization. The PHY includes circuitry to maintain a current time, and to trigger the storage of timestamps corresponding to received frames. Typically, in response to a request from an external device, the timestamps are retrieved from storage and are communicated to the external device. By moving the triggering of the storage of the timestamps by the PHY itself, rather than by a monitoring of the traffic between the PHY and the Media Access Controller (MAC), higher accuracy can typically be achieved.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "frame" is used herein interchangeably with the term "packet." The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism tangibly embodying instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed, inter alia, is a Physical Layer Transceiver (PHY) with integrated time synchronization, such as, but not limited to, IEEE 1588 Standard for a Precision Clock Synchronization Protocol for Networked Measurement and Control Systems. In one embodiment, the PHY includes: analog circuitry configured to transmit to, and receive data from, a data transmission medium; storage; digital circuitry, coupled to the analog circuitry, and configured to transmit to, and receive from, a Media Access Controller (MAC), and to communicate timestamps stored in the storage to an external device; and timing circuitry, coupled to the digital circuitry, configured to generate timestamps. The PHY is configured to cause a timestamp to be stored in said storage for each of a plurality of received and/or sent frames.

In one embodiment, the PHY is disposed on a single physical chip. In one embodiment, the PHY includes multiple MAC to media interfaces, which are each configured to use the timestamps generated by the timing circuitry. In one embodiment, the analog circuitry and/or the digital circuitry is configured to cause the storage of the timestamps. In one embodiment, the digital circuitry implements a state machine for identifying whether or not to cause a timestamp to be stored for a particular frame. In one embodiment, the interface circuitry is configured to communicate the timestamps stored in the storage to the external device.

In one embodiment, the timestamps are generated based on a clock according to an IEEE 1588 Standard for a Precision Clock Synchronization Protocol for Networked Measurement and Control Systems (1588). In one embodiment, the 1588 clock is a slave clock, and said timing circuitry is configured to receive timing messages from, and send timing messages to, a 1588 master clock. In one embodiment, the 1588 clock is a master clock, and said timing circuitry is configured to receive timing messages from, and send timing messages to, a 1588 slave clock.

In one embodiment, the MAC corresponds to IEEE 802.3, and said digital circuitry is configured to use said storage for storing an IEEE 802.3 memory map. In one embodiment, the timestamps are stored in, or accessed via, a vendor specific portion of the IEEE 802.3 memory map. In one embodiment, the predetermined configuration parameters for controlling said generation of timestamps are stored in said memory map.

In one embodiment, which frames comprise the plurality of frames are determined based on a parsing of frames to identify whether or not a timestamp should be stored for a parsed frame. In one embodiment, the PHY is configured to adjust a current timestamp from said timing circuitry by a parsing delay to represent the time that the start of the frame was sent or received in response to said identification to store a particular parsed frame.

One embodiment is performed by a Physical Layer Transceiver (PHY) disposed within a computer chip. A current time is maintained. A media access control (MAC) frame is generated based on data received from a data transmission medium, with the frame being forwarded to a MAC. A timestamp is stored based on the current time and when the frame was received from the data transmission medium in storage (e.g., when the start of frame was detected, when a particular portion of the frame was detected, upon receipt of the entire frame, etc.). Subsequent to said forwarding the MAC frame to the MAC, the timestamp is received from said storage and forwarded to an external device.

One embodiment includes: subsequent to said forwarding the MAC frame to the MAC, receiving a request for the timestamp from the external device; and wherein said retrieving and forwarding of the timestamp is performed in response to said receipt of the request for the timestamp. In one embodiment, said maintaining the current time includes aligning the current time with an external timing source according to IEEE 1588 Standard for a Precision Clock Synchronization Protocol for Networked Measurement and Control Systems. One embodiment includes sending and receiving of time synchronization messages with an external clocking device and updating the current time based on one or more of said time synchronization messages.

One embodiment is performed by a Physical Layer Transceiver (PHY) disposed within a computer chip. A current time is maintained. A media access control (MAC) frame is received from a MAC. Data corresponding to the MAC frame is transmitted on a data transmission medium. A timestamp is stored based on the current time and when the frame was transmitted on the data transmission medium. Subsequent to said transmitting data, the timestamp is retrieved from storage and forwarded to an external device.

In one embodiment, subsequent to the forwarding the MAC frame to the MAC, a request for the timestamp is received from the external device; and wherein said retrieving and forwarding of the timestamp is performed in response to said receipt of the request for the timestamp. In one embodiment, maintaining the current time includes aligning the current time with an external timing source according to IEEE 1588 Standard for a Precision Clock Synchronization Protocol for Networked Measurement and Control Systems. One embodiment includes: sending and receiving of time synchronization messages with an external clocking device and updating the current time based on one or more of said time synchronization messages.

Figure 2:
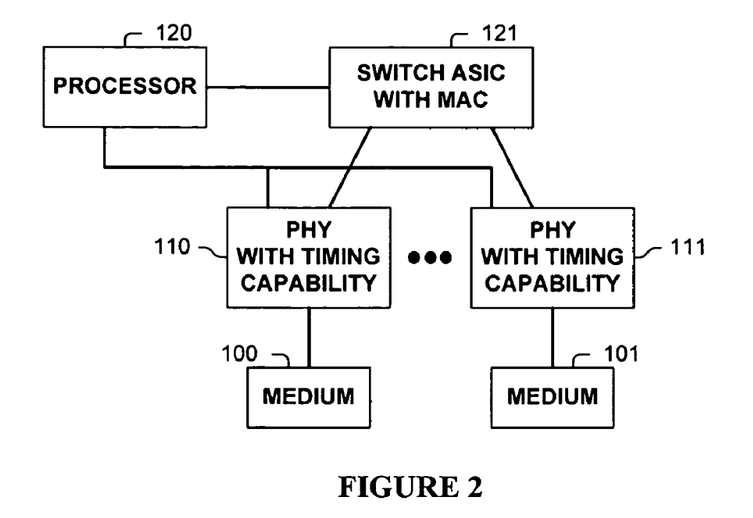
FIG. 2 is a block diagram illustrating a configuration of one embodiment including PHY devices with internal timing capability.

Turning to the figures, FIG. 2 illustrates a configuration of one embodiment including PHY devices with internal timing capability. Illustrated are two PHY devices (110, 111) with timing capability, such as, but not limited to, those disclosed herein (e.g., IEEE 1588 Standard for a Precision Clock Synchronization Protocol for Networked Measurement and Control Systems). PHY devices 110-111 receive and transmit frames between media 100 and 101 to the MAC in Switch ASIC 121. PHY devices (110, 111) maintain the current time, and associate timestamps with the arrival and/or transmission of frames. Typically, only a selected portion of the frames have timestamps associated with them. Therefore PHY devices 110, 111 may perform some parsing of the frames to identify whether or not to associate a timestamp with a particular frame, or possibly, to identify whether or not to drop a generated timestamp corresponding to the start of the frame.

Processor 120 communicates with PHY devices 110 and 111 typically to set and adjust the current time, as well as to retrieve timestamps of frames of interest. For example, processor 120 will send a request to the appropriate PHY device (110, 111), which will retrieve the corresponding timestamp(s) (e.g., identified by a specified signature (e.g., hash value or value of a field from a frame, etc.) of a frame with an associated timestamp being stored in memory in PHY device 110, 111), and communicate the corresponding timestamp back to processor 120. In one embodiment, processor 120 controls one or more of PHYs 110-111. In one embodiment, processor 120 controls the time synchronization functionality of PHYs 110-111, including, but not limited to, turning on and off the functionality.

Figure 3A:
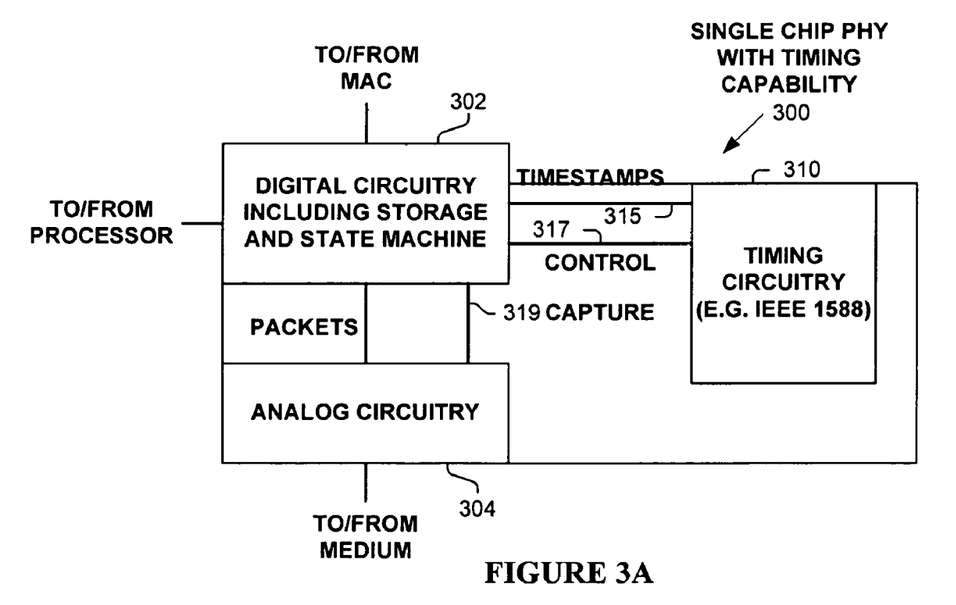
FIG. 3A is a block diagram illustrating a configuration of one embodiment of a PHY device with internal timing capability.

FIG. 3A is a block diagram illustrating a configuration of one embodiment of a PHY device 300 with internal timing capability. As shown, PHY 300 includes timing circuitry 310 to maintain a current time (e.g., a global system-wide time, such as according to IEEE 1588 Standard for a Precision Clock Synchronization Protocol for Networked Measurement and Control Systems), and to provide timestamps (315) to digital circuitry 302 for associating with received frames.

In one embodiment, digital circuitry 302 includes storage for storing timestamps (315) associated with frames, as well as one or more state machines for processing, receiving and forwarding frames. In one embodiment, one of these state machines adds to the standard processing, receiving and forwarding of frames the functionality of identifying when to timestamp a frame.

Analog circuitry 304 performs the standard functionality of transmitting and receiving frames to/from a medium. In one embodiment, analog circuitry 304 provides a capture signal 319 to digital circuitry to capture and store a timestamp for a frame that is being received or transmitted.

Additionally, in one embodiment, digital circuitry 302 provides an interface to a processor for communicating timing setup information, if required, and for communicating stored timestamps, either via a push (e.g., automatically forward the timestamps to another device) or pull (e.g., forward the timestamps in response to a request for the timestamps) communication process.

Figure 3B:
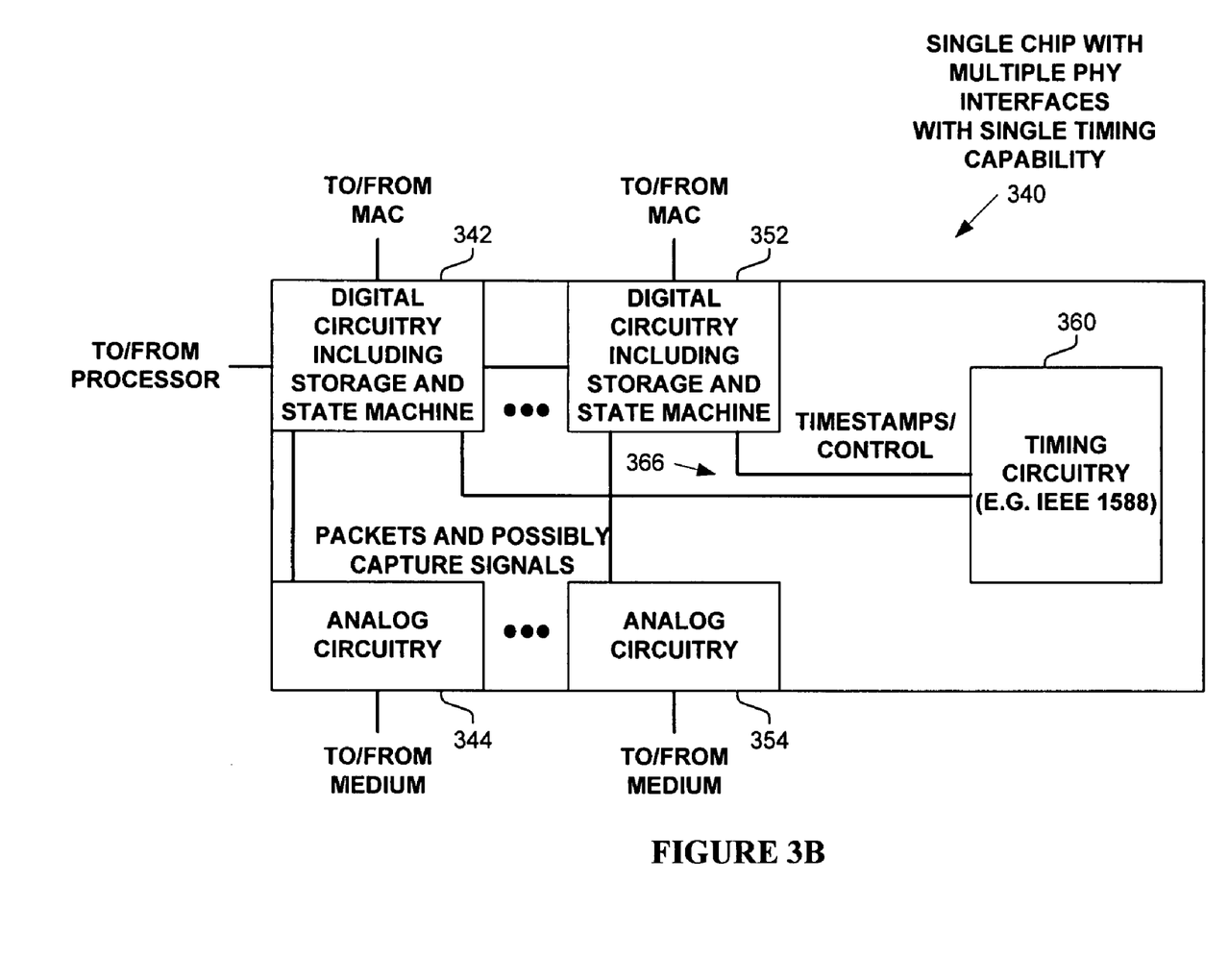
FIG. 3B is a block diagram illustrating a configuration of one embodiment of a multiple PHY device sharing an internal timing capability.

FIG. 3B is a block diagram illustrating a configuration of one embodiment of a multiple PHY device 340 sharing an internal timing capability 360. Digital circuitry 342, 352 operates in the same manner as described in relation to digital circuitry 302 of FIG. 3A, and analog circuitry 344, 354 operates in the same manner as described in relation to analog circuitry 304 of FIG. 3A.

Figure 4:
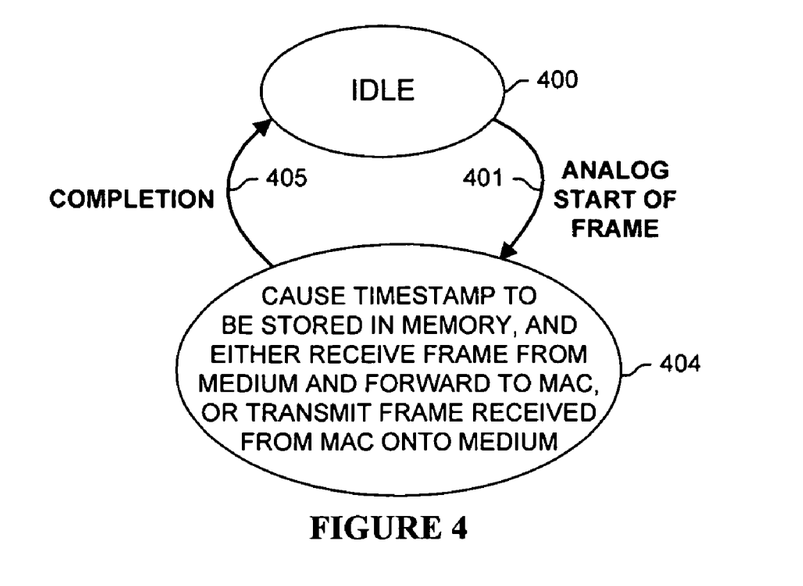
FIG. 4 is a block diagram illustrating a state diagram of a subset of operations performed in one embodiment.

FIG. 4 is a block diagram illustrating a state diagram of a subset of operations performed in one embodiment. Illustrated is idle state 400. In response to the detection or start of action by analog circuitry of receiving from or transmitting a frame on the medium, the current state transitions to state 404, wherein a timestamp is caused to be stored in memory, and the standard formulation of a frame being received and forwarded to the MAC or being transmitted onto the medium is performed. Upon completion (405) the state returns to idle state 400.

Figure 5A:
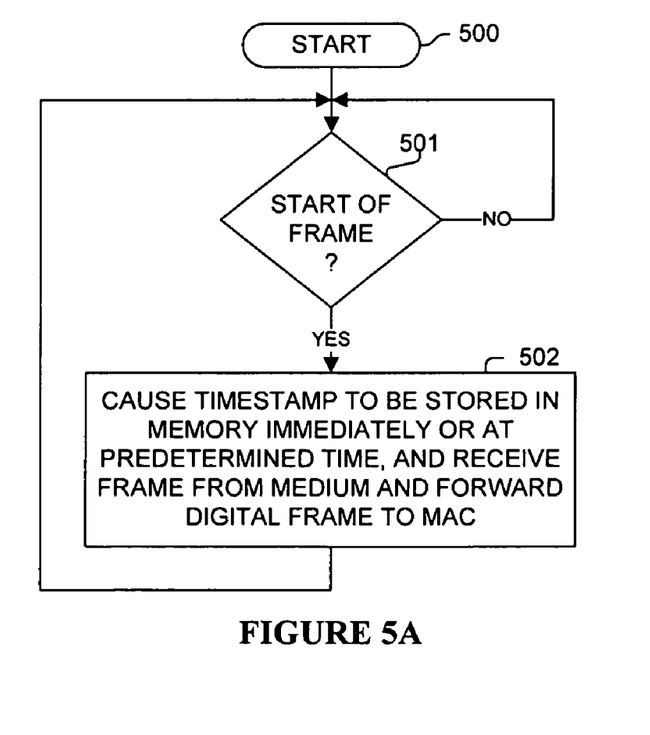
FIGS. 5A-B and 6 are flow diagrams illustrating processes performed in one embodiment.
Figure 5B:
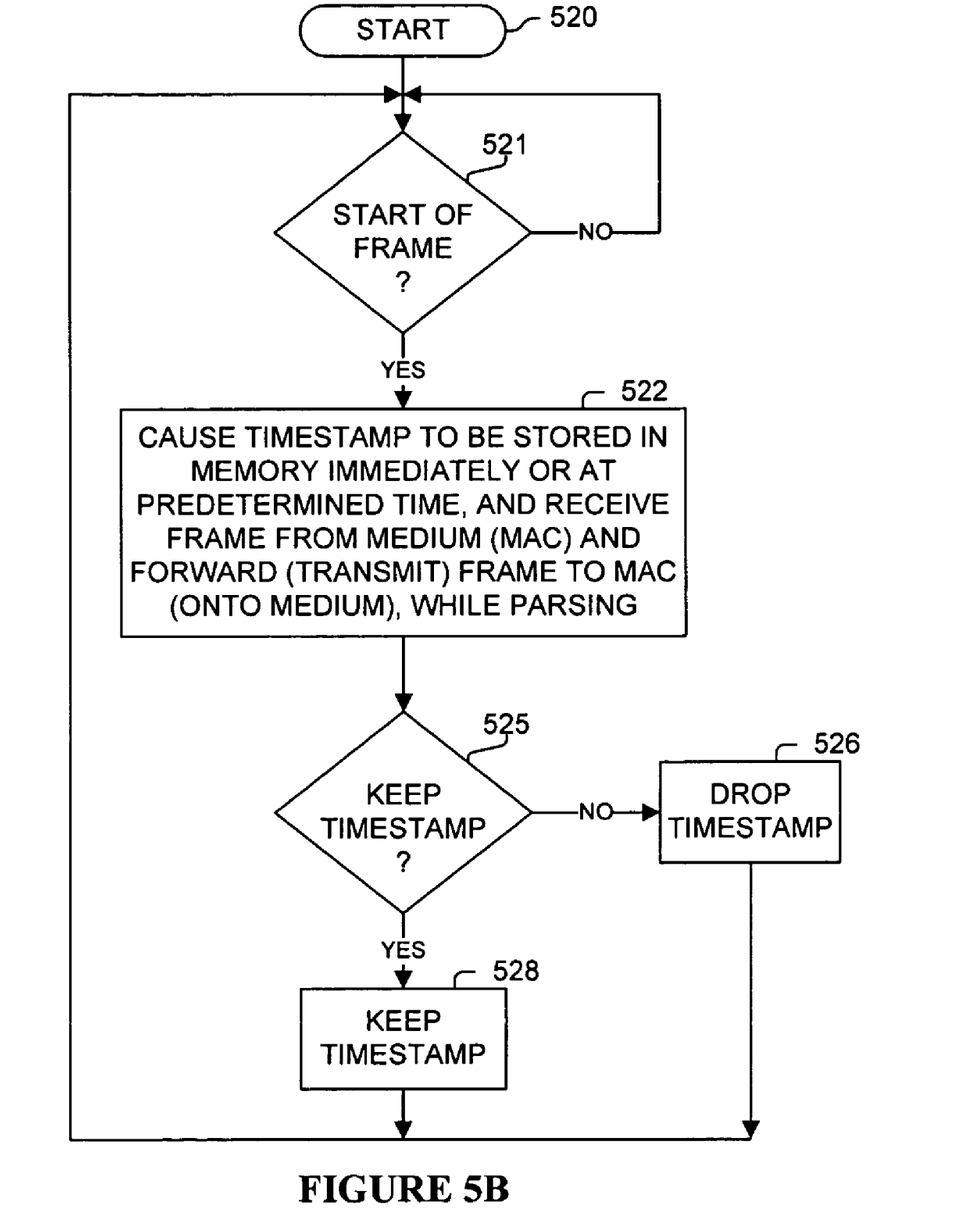
Figure 6:
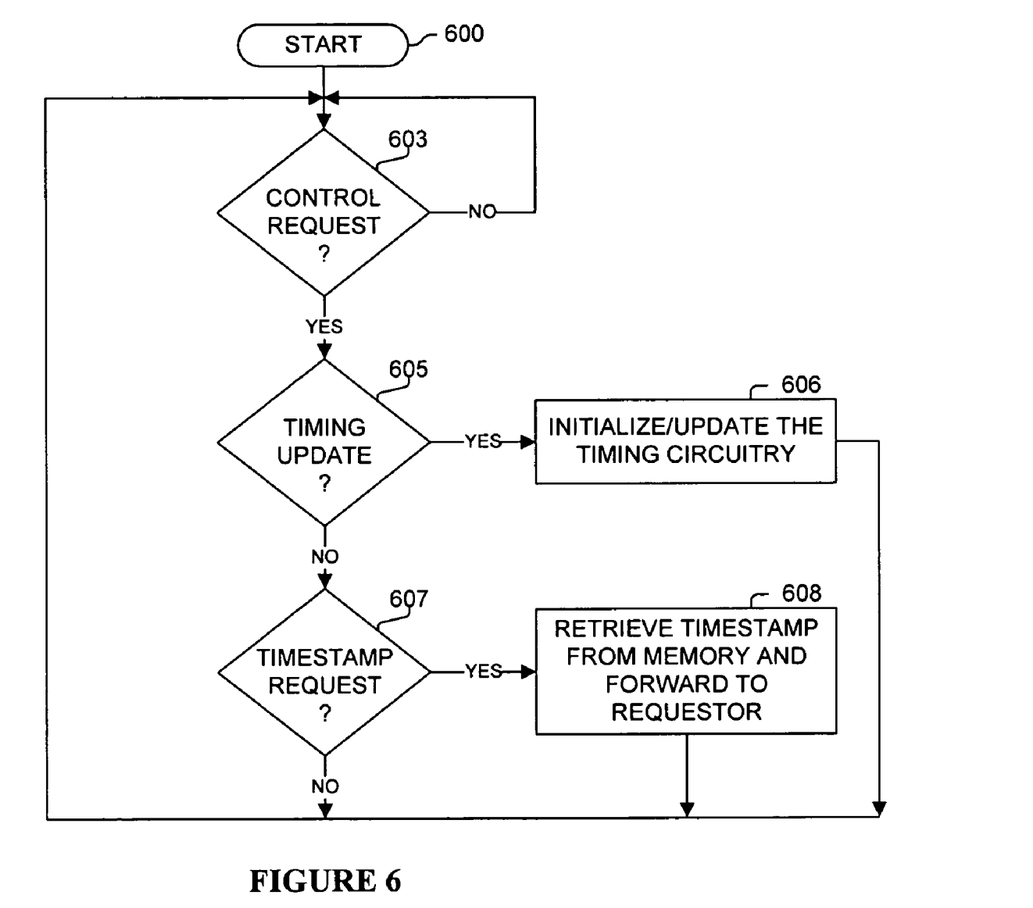

FIGS. 5A-B and 6 are flow diagrams illustrating processes performed in one embodiment.

FIG. 5A is used to illustrate a basic process used in one embodiment for associating timestamps with frames. Processing of FIG. 5A begins with process block 500. As determined in process block 501, upon start of a frame, processing proceeds to process block 502, wherein a timestamp (current or adjusted current value such as to accommodate a processing delay) is caused to be stored in the memory (or other storage) either immediately or at a predetermined time (e.g., after a delay to a particular byte of a frame), and the frame is received from the medium and a digital frame is forwarded to the MAC. Processing returns to process block 501.

FIG. 5B is used to illustrate a process used in one embodiment for associating timestamps with frames and then determining whether to keep the timestamp based on a parsing of the frame. Processing of the flow diagram of FIG. 5B begins with process block 520. As determined in process block 521, upon start of a frame, processing proceeds to process block 522, wherein a timestamp (current or adjusted current value such as to accommodate a processing delay) is caused to be stored in the memory (or other storage) either immediately or at a predetermined time (e.g., after a delay to a particular byte of a frame), and the frame is received from the medium (or MAC) and a frame is forwarded to the MAC (or transmitted onto the medium). Also, the frame is processed to identify whether or not to keep the timestamp. Thus, a timestamp as close as possible to the actual start of frame is available, if desired as determined by the parsing of the frame. As determined in process block 525, if the timestamp is to be kept, then it is kept (e.g., not dropped and possibly moved to another storage location); else, it is dropped in process block 526. Processing returns to process block 521.

FIG. 6 is used to illustrate a basic control process used in one embodiment for setting and/or adjusting the time, as well as communicating timestamps retrieved from storage to a remote device. Processing of FIG. 6 begins with process block 600. When a control request is received as determined in process block 603, then if it corresponds to a timing update, then in process block 606, the timing circuitry is initialized/updated. Otherwise, if the control request corresponds to a timestamp request as determined in process block 607, then in process block 608, the corresponding timestamp is retrieved from memory (or other storage) and communicated to the requestor. In one embodiment, a control request for a timestamp will contain some signature (e.g., hash value or value of a field from a frame, etc.) of the frame so that its associated timestamp can be readily identified. Processing returns to process block 603.

Figure 7:
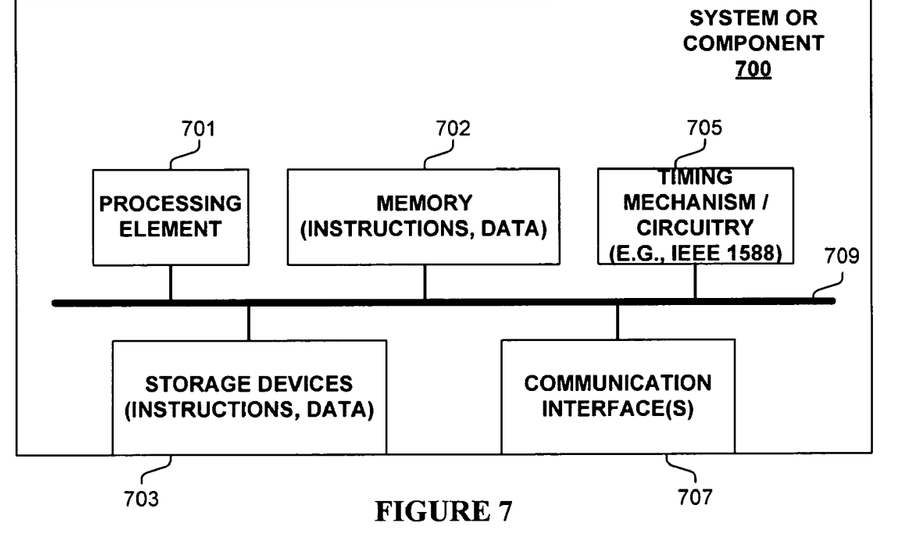
FIG. 7 is a block diagram of a system or component used in one embodiment.

FIG. 7 is block diagram of a system or component 700 used in one embodiment of a communications device (e.g., PHY) or system. In one embodiment, system or component 700 performs one or more processes corresponding to one of the flow diagrams illustrated or otherwise described herein. In one embodiment, system or component 700 corresponds to PHY, or portion thereof.

In one embodiment, system or component 700 includes a processing element 701, memory 702, storage devices 703, specialized components 705 (e.g. timing mechanism compliant with IEEE 1588 Standard for a Precision Clock Synchronization Protocol for Networked Measurement and Control Systems), and interfaces 707 for sending and receiving frames and/or communicating frames between a medium and a MAC. These elements are typically communicatively coupled via one or more communications mechanisms 709, with the communications paths typically tailored to meet the needs of the application.

Various embodiments of component 700 may include more or less elements. The operation of component 700 is typically controlled by processing element 701 using memory 702 and storage devices 703 to perform one or more tasks or processes. Memory 702 is one type of computer-readable medium, and typically comprises random access memory (RAM), read only memory (ROM), flash memory, integrated circuits, and/or other memory components. Memory 702 typically stores computer-executable instructions to be executed by processing element 701 and/or data which is manipulated by processing element 701 for implementing functionality in accordance with an embodiment. Storage devices 703 are another type of computer-readable medium, and typically comprise solid state storage media, disk drives, diskettes, networked services, tape drives, and other storage devices. Storage devices 703 typically store computer-executable instructions to be executed by processing element 701 and/or data which is manipulated by processing element 701 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

The invention claimed is:

1. A Physical Layer Transceiver (PHY), comprising:
analog circuitry configured to transmit to, and receive data from, a data transmission medium external to the PHY;
storage;
digital circuitry coupled to said analog circuitry, with said digital circuitry configured to transmit to, and receive from, a Media Access Controller (MAC) external to the PHY, said digital circuitry including interface circuitry configured to communicate timestamps stored in said storage to an external device that is external to the PHY; and
timing circuitry, coupled to said digital circuitry, configured to generate timestamps;
wherein the PHY is configured to cause a timestamp to be stored in said storage for each of a plurality of frames;
wherein "PHY" is defined to be the Physical Layer Transceiver itself, and which is different than a particular device, such as a transceiver card or board, including the PHY or including the PHY and the MAC.

2. The PHY of claim 1, wherein the PHY is disposed on a single physical chip.

3. The PHY of claim 1, comprising an additional one or more MAC to media interfaces, each including its own analog circuitry configured to transmit to, and receive data from, a different data transmission medium and its own digital circuitry coupled to its said analog circuitry, its said digital circuitry configured to transmit to, and receive from, the MAC; wherein each of these said additional MAC to media interfaces receives and uses said timestamps generated by said timing circuitry.

4. The PHY of claim 3, wherein the PHY is disposed on a single physical chip, with the MAC being external to the physical chip.

5. The PHY of claim 3, wherein said analog circuitry is configured to cause said storage of said timestamps.

6. The PHY of claim 1, wherein said digital circuitry is configured to cause said storage of said timestamps.

7. The PHY of claim 6, wherein said digital circuitry implements a state machine for identifying whether or not to include in the plurality of frames a particular frame such that if included in the plurality of frames a timestamp is said caused to be stored for the particular frame.

8. The PHY of claim 1, wherein said interface circuitry to communicate data stored in said storage to an external device includes circuitry to communicate said timestamps stored in said storage to the external device.

9. The PHY of claim 1, wherein which frames comprise the plurality of frames are determined based on a parsing of frames to identify whether or not a timestamp should be stored for a parsed frame.

10. The PHY of claim 9, wherein the PHY is configured to adjust a current timestamp from said timing circuitry by a parsing delay to represent the time that the start of the frame was sent or received in response to said identification to store a particular parsed frame.

11. The PHY of claim 1, wherein said analog circuitry is configured to cause said storage of said timestamps.

12. A method, comprising:
maintaining a current time;
generating a media access control frame based on data received from a data transmission medium, and forwarding the media access control frame to a Medium Access Controller (MAC);
storing a timestamp based on the current time and when the frame was received from the data transmission medium in storage;
subsequent to said forwarding the media access control frame to the MAC, retrieving the timestamp from said storage and forwarding said retrieved timestamp to an external device;
wherein the method is performed by a Physical Layer Transceiver (PHY) disposed with a computer chip;
wherein each of the MAC, the external device, and the data transmission medium is external to the computer chip;
wherein "PHY" is defined to be the Physical Layer Transceiver itself, and which is different than a particular device, such as a transceiver card or board, including the PHY or including the PHY and the MAC.

13. The method of claim 12, comprising: subsequent to said forwarding the media access control frame to the MAC, receiving a request for the timestamp from the external device; and wherein said retrieving and forwarding of the timestamp is performed in response to said receipt of the request for the timestamp.

14. The method of claim 12, comprising: sending and receiving of time synchronization messages with an external clocking device and updating the current time based on one or more of said time synchronization messages.

15. A method, comprising:
maintaining a current time;
receiving a media access control frame from a Medium Access Controller (MAC);
transmitting data corresponding to the media access control frame on a data transmission medium;
storing, in storage, a timestamp based on the current time and when the media access control frame was transmitted on the data transmission medium;
subsequent to said transmitting data, retrieving the timestamp from said storage and forwarding said retrieved timestamp to an external device;
wherein the method is performed by a Physical Layer Transceiver (PHY) disposed with a computer chip;
wherein each of the MAC, the external device, and the data transmission medium is external to the computer chip;
wherein "PHY" is defined to be the Physical Layer Transceiver itself, and which is different than a particular device, such as a transceiver card or board, including the PHY or including the PHY and the MAC.

16. The method of claim 15, comprising: subsequent to said forwarding the media access control frame to the MAC, receiving a request for the timestamp from the external device; and wherein said retrieving and forwarding of the timestamp is performed in response to said receipt of the request for the timestamp.

17. The method of claim 15, comprising: sending and receiving of time synchronization messages with an external clocking device and updating the current time based on one or more of said time synchronization messages.

18. A Physical Layer Transceiver (PHY), comprising:
means for maintaining a current time;
means for receiving data on a data transmission medium and for forwarding a media access control frame based on said received data to a Medium Access Controller (MAC), and for receiving a media access control frame from the MAC and forwarding data on the data transmission medium based on the received media access control frame;
means for storing a timestamp based on the current time and when the media access control frame was received from, or transmitted on, the data transmission medium in storage;
means for retrieving the timestamp from said storage and forwarding said retrieved timestamp to an external device in response to a received request for the timestamp, the received request being generated by a device different from the MAC; and
means for, in response to the received request, retrieving the timestamp from said storage and forwarding said retrieved timestamp to an external device;
wherein each of the MAC, the external device, and the data transmission medium is external to the PHY;
wherein "PHY" is defined to be the Physical Layer Transceiver itself, and which is different than a particular device, such as a transceiver card or board, including the PHY or including the PHY and the MAC.

19. The PHY of claim 18, wherein said means for maintaining the current time includes: means for sending and receiving of time synchronization messages with an external clocking device and updating the current time based on one or more of said time synchronization messages.

20. The PHY of claim 18, wherein said means for receiving data on a data transmission medium and for forwarding a media access control frame based on said received data to a Medium Access Controller (MAC), and for receiving a media access control frame from the MAC and forwarding data on the data transmission medium based on the received media access control frame includes analog circuitry; and wherein said analog circuitry is configured to cause said storage of said timestamps.

* * * * *